Figure 1:
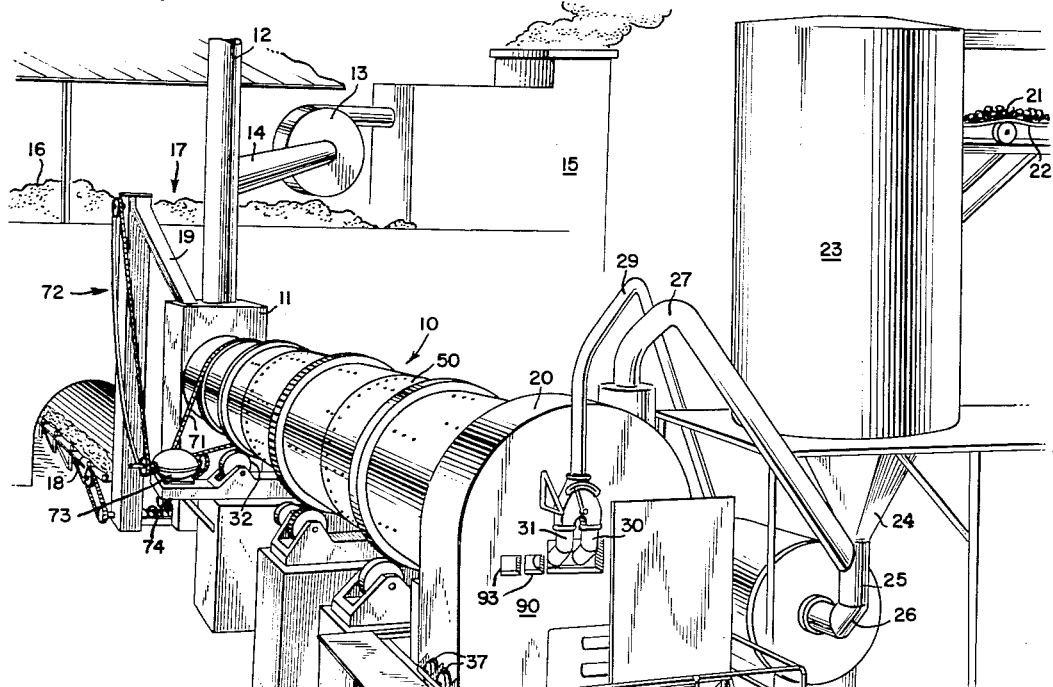

Oct. 18, 1955     A. F. OLD ET AL     2,721,069

LIGHTWEIGHT AGGREGATE, AND APPARATUS AND PROCESS

Filed July 20, 1954     2 Sheets-Sheet 1

INVENTORS
A. F. OLD
R. F. GIBSON

BY *A. Yatts Dowell*

ATTORNEY

Oct. 18, 1955  A. F. OLD ET AL  2,721,069
LIGHTWEIGHT AGGREGATE, AND APPARATUS AND PROCESS
Filed July 20, 1954  2 Sheets-Sheet 2
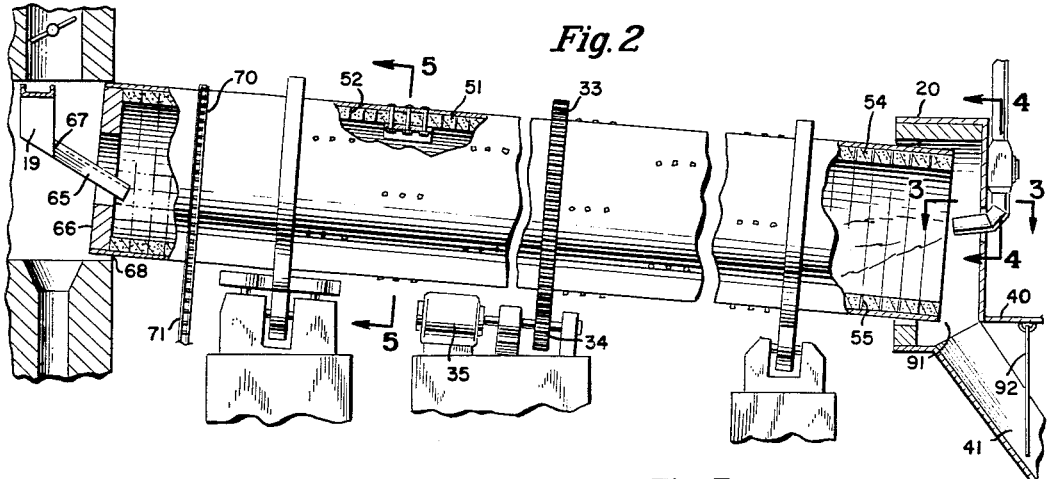
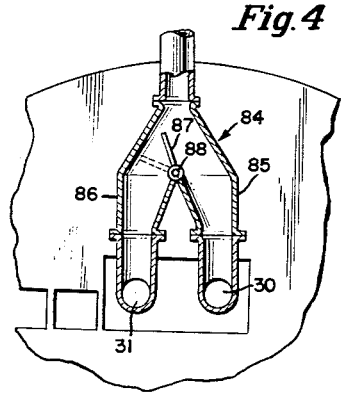
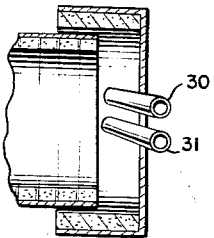
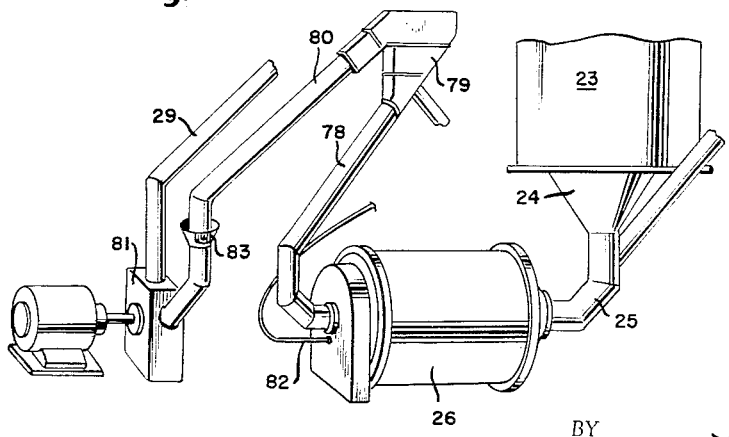
INVENTORS
A.F. OLD
R.F. GIBSON
BY
ATTORNEY United States Patent Office 2,721,069
Patented Oct. 18, 1955

2,721,069

LIGHTWEIGHT AGGREGATE, AND APPARATUS AND PROCESS

Albert Floyd Old, Bremo Bluff, Va., and Richard Francis Gibson, Albemarle, N. C., assignors to Southern Lightweight Aggregate Corporation, Richmond, Va.

Application July 20, 1954, Serial No. 444,532

8 Claims. (Cl. 263—21)

This invention relates to lightweight aggregates and more particularly to a novel process and apparatus for their production, and to the resulting product.

Heretofore, lightweight aggregates of various types have been produced from various raw materials. One class of raw material contains substances which when subjected to the proper heat treatment cause the materials to expand. When cooled, the materials remain in expanded condition, the resulting product having a substantially lower specific gravity.

Another class of materials which does not in the natural state contain substances which will cause expansion when subjected to heat treatment, requires the addition of such substances. In order to produce a lightweight aggregate by the addition of substances of this nature it is necessary to finely pulverize both the raw material and the added substance, to form nodules of the pulverized material, and then to heat treat the latter.

Lightweight aggregates are used for both load-bearing and non-load-bearing concretes as well as insulation materials and the like. The aggregate of this invention is adapted for load-bearing as well as non-load-bearing structure. Such aggregate must conform to acceptable standards. These include substantially equal strength in all directions, high crushing strength, low absorptivity, "block" shape particles, and high resistance to weathering.

Although various raw materials have been employed heretofore, the resulting aggregate has suffered from deficiencies such as inferior strength, weakness along laminations or planes, too high absorptivity, and the like. The use of slate as a raw material has been suggested but due to the necessity for critical control of the heat treatment, its use up until the present invention has been limited.

Accordingly, it is an object of the present invention to provide a process and apparatus for the heat treatment of raw materials to produce a lightweight aggregate, the process and apparatus being particularly adapted for heat treatment under critical conditions.

A further object is to produce a lightweight aggregate for use in concrete and having the following desirable characteristics:

(a) High crushing strength.
(b) Uniform crushing strength in all directions.
(c) Low absorptivity, due chiefly to extremely small size of voids therein and independence thereof, and formation of protective coating on the particles.
(d) Particle shape approximately block or cubical, rather than flat, narrow and long, or spherical.
(e) Surface substantially free from large irregularities, thus eliminating weak portions in particles.
(f) High resistance to slaking or disintegration resulting from weathering.
(g) Uniformly strong particles of larger sizes (e. g. 2–3 inches) are obtainable.

Figure 7:
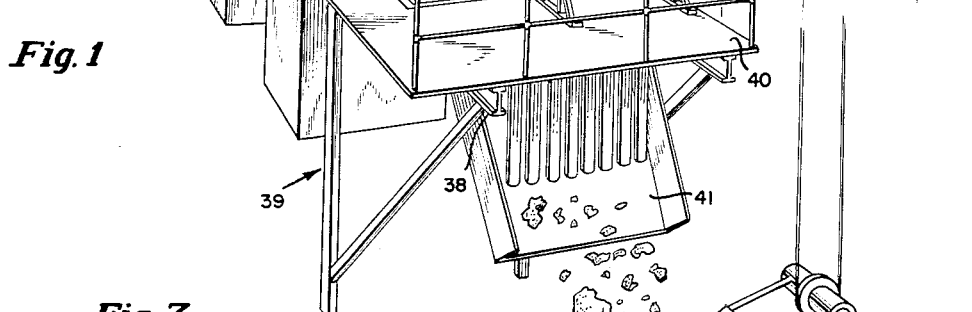
Figure 9:
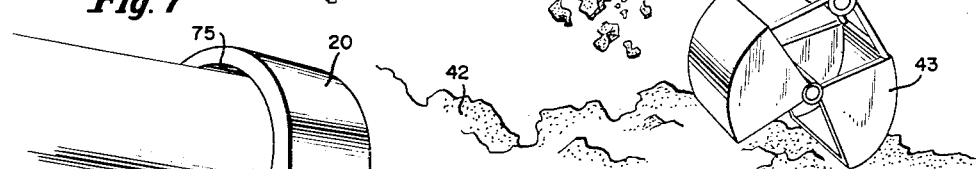

These and other objects of the invention will become apparent from the following description in conjunction with the accompanying drawings, in which:

Fig. 1 is a perspective from the discharge end of a kiln and associated apparatus, for practicing the invention;

Fig. 2, a side elevation of a kiln and associated apparatus, with parts broken away and in section for greater clarity;

Fig. 3, a section on the line 3—3 of Fig. 2;

Fig. 4, a section on the line 4—4 of Fig. 2;

Fig. 5, a section on the line 5—5 of Fig. 2;

Fig. 6, a perspective of the coal pulverizing and air feed arrangement;

Fig. 7, a fragmentary perspective showing the positioning of the kiln in the firing hood;

Fig. 8, an elevation of a representative lump of aggregate with an end portion broken off to reveal the interior structure; and Fig. 9, a perspective of a lifting cleat of the type used in the kiln.

In the production of lightweight aggregates argillaceous materials are frequently used. These have usually consisted chiefly of weathered materials such as clay, or unweathered materials such as shale which occur in laminated form, the laminations usually being close together. As a result, when such materials are expanded, the laminations produce planes of weakness wherever they occur. If close together several may occur in a single piece of aggregate. If the laminations are separated by thin planes of mica, as is frequently the case, the weakness is accentuated. Where laminations occur in the raw material, large air bubbles or voids may result in the expanded production. After being heat treated, the aggregates are frequently crushed and such crushing operation may expose the large air bubbles which provide surfaces of undesirably high absorption. A further deficiency is that slivers may result which decrease the workability of the aggregate.

Slate has been considered heretofore for use in the production of aggregates; however, until the present invention its use has been limited or not been commercially successful for various reasons. Among these, unweathered argillaceous slate usually occurs in relatively thin laminations which produce the deficiencies referred to above. Furthermore, in the heat treatment of slate to expand it and produce a desirable aggregate, difficulties are encountered which have not been successfully overcome up until the present invention. Upon reaching a temperature sufficient for its expansion, slate is in a pyroplastic or semiviscous state and unless appropriate heat treatment is employed, large agglomerations result, including substantial masses of vitrified material. Masses of vitrified material have high specific gravity and a substantial percentage of such material would raise the specific gravity of the aggregate beyond acceptable limits, in addition to other disadvantages. On the other hand, if the material is not sufficiently elevated in temperature, expansion will be inadequate or non-existent.

In carrying out the present invention, it has been discovered that argillaceous weathered slate, which has heretofore been considered as of little or no value, can be used to produce a superior aggregate. Weathered slate is slate that has lain close to the surface of the earth for a period of years and during this time has been subjected to repeated cycles of freezing and thawing, to erosion, and has been permeated to some degree with substances such as clay, or silt that has flowed down into the voids. The result has been that the cleavage lines or planes have been broken or displaced. As a result, when such material is ground to the desired size for heat treatment, the individual particles are substantially free of cleavage lines. A further unexpected result has been that the inclusion in the particles of the clay deposits has helped to overcome certain difficulties in the heat treatment.

Another feature of the present invention is that certain non-argillaceous slate deposits have been discovered and the lightweight aggregate produced therefrom is unlike aggregates that have been produced from other materials. In the case of non-argillaceous slate deposits the laminations occur at wide intervals, for example, as far apart as 37 inches. As a result the crushed raw material is substantially entirely free of laminations.

Although certain raw materials have been discussed the apparatus and process described are applicable to others, including those to which bloating agents must be added.

The aggregate which is produced from this non-argillaceous slate is substantially homogeneous. The interior, beneath the vitrified skin, has a grayish-green or bluish appearance and is permeated throughout by pinholes or voids ranging from about the size of the head of a pin downwardly, the finest being imperceptible by the unaided eye. As a result of the lack of planes of weakness, aggregate produced from this raw material may be used without crushing and in size as large as is desired. Thus, for the first time, lightweight aggregates of sizes up to several inches may be obtained which have the strength necessary for load-carrying installations. Heretofore, it has been necessary to crush the larger sizes of lightweight aggregate in order to break down or separate planes of weakness occurring therein.

Briefly stated, the process of producing lightweight aggregate from the raw materials discussed herein is as follows. After being mined, the material is crushed to suitable size and is fed into the stack end of an inclined elongated kiln. Within the kiln, Z-shaped lifting members are attached to the wall and these assist in lifting the material as the kiln slowly rotates in order to subject all the material to the heat treatment. The material, as a result of the inclination of the kiln and the rotation thereof, slowly moves longitudinally of the kiln.

In passing through approximately the first 25% of the kiln's length its temperature is gradually raised to 600°–1200° F., and in this zone moisture is slowly removed from the material. Moving on, the material passes into the second zone which comprises approximately two-thirds of the kiln's length. In passing through the second zone, the temperature is raised to approximately 1700°–1900° F. All the heat in zones one and two is received from the heated gases, including the gaseous productes of combustion, which are produced in the discharge end of the kiln. No flame contact or close proximity occurs in zones one and two.

Entering the remainder of the kiln's length, referred to as zone three, which is about 10%–15% of the kiln's length, the material is subjected to extremely intense heat produced by a pair of nozzles so that it is quickly raised to approximately 2200° F. (argillaceous material) or 2250° F. (non-argillaceous material), producing expansion of the material. The maximum temperature is very critical, although it varies slightly depending on the batch of material and other factors. The maximum permissible deviation therefrom, for argillaceous materials is around 40° F., and for non-argillaceous materials is only approximately 15° F. The use of temperatures below the optimum in excess of the permissible variation results in an insufficiently expanded product; those above the optimum in excess of the permissible limit produce excessive fluidity of the material resulting in agglomerations, and an increase in density due to breakdown of air cells.

The region of extreme heat is only a few feet in extent 3–5 feet approximately) and as soon as the material pases beyond it, it is cooled by air that is drawn into the kiln. The cooling temperature is below that at which the material agglomerates and as a result the tendency of the material to become fluid and to coalesce is overcome so that upon discharge of the material from the kiln, the particles of aggregate are substantially discrete.

It will be understood that what has been accomplished is to suddenly raise the temperature of a large mass of material to a critical limit and within a space of a few feet lower it to substantially below the critical. In order to accomplish this, it is necessary to subject the material to a large source of heat at high temperature. One difficulty in accomplishing this, heretofore, has been that of maintaining the material at a substantially lower temperature throughout the kiln up to the point at which expansion occurs. If this were not done, the material approaching the critical zone would approximate its temperature with the result that a very large mass of material within the kiln would be close to the critical temperature and control of the process would be practically impossible.

As will be further described later on, applicants' invention includes means by which the velocity of movement of the heated gases longitudinally of the kiln, counter to the flow of material, is substantially lower than would occur through the use of conventional kiln practice. The result is that movement of the heated gases through the kiln is very gradual, resulting in more effective concentration of heat at the zone where expansion occurs and in more gradual raising of the temperature of the material approaching this zone. Furthermore as a result of limiting the intake of secondary air, firing within the kiln occurs in a reducing atmosphere which promotes the production of a satisfactory aggregate.

Other factors in the method of operation will become apparent as the description of the apparatus proceeds.

Referring to the drawings, a kiln 10 is illustrated which may be of various dimensions. For purposes of illustration a preferred form is 110 feet long and has an external diameter of 8 feet. In the entrance end the kiln extends into a housing 11 at the lower part of stack 12. Products of combustion may discharge through the stack or be drawn off by a blower 13 through chute 14 to a dust collector 15.

Crushed raw material 16 from stock pile 17 may be fed by suitable means, not shown, to a conveyor belt 18 for discharge into a chute 19 into the kiln. At the discharge end the kiln is received in a firing hood 20.

Lump coal 21 is fed on a conveyor 22 to a supply bin 23 for discharge through a hopper 24 and chute 25 to a pulverizer 26. Heated air from the firing hood is drawn off through pipe 27 into the chute 25 to preheat the coal in the pulverizer. From the pulverizer, the pulverized fuel mixed with the required amount of air is blown through the pipe 29 to a pair of nozzles 30, 31 which terminate near the end of the kiln.

The kiln is supported on spaced rollers 32 and is rotated by a ring gear 33 on its outer surface which is driven from a pinion 34 operated from a suitable source of power 35. The firing hood 20 is supported by wheels 37 at each side thereof mounted on rails 38 carried by frame 39. An operator's platform 40 is also supported on the rails and framework. Material discharging from the kiln drops onto a chute 41 from which it falls to a stock pile 42 for removal by a clamshell or other suitable type of shovel 43.

Referring more particularly to the kiln structure, the kiln has an exterior wall 50 comprising a plurality of cylindrical or semi-cylindrical sections joined together by suitable fastening means. The main portion of the kiln is lined with monolithic concrete 51 which is poured onto a lattice-work of iron strips 52 carried by the walls 50. The width of the iron strips is approximately the same as the thickness of the concrete, the result being that the tumbling material within the kiln contacts the edges of the iron strips, these absorbing a substantial amount of the wear from the abrasive action of the material and thereby lengthening the life of the lining.

Near the discharge end of the kiln the monolithic lining is discontinued and blocks 54 are employed instead. Between the blocks are metal strips or shims 55 which expand when subjected to the temperatures occurring in the kiln.

The result is that the expansion produces a tight fit between the blocks in the kiln. The strips absorb wear which would otherwise occur to the blocks, thus lengthening their life.

At spaced intervals around the kiln Z-bars or cleats 58 are provided. These have one leg 59 attached to the kiln wall by fasteners 60. As indicated in Fig. 9, the leg 59 has a central aperture 61 and an elongated opening 62 on either side thereof, the elongation permitting expansion and contraction of the members. Various numbers of cleats 58 may be employed at any given section of the circumference of the kiln, four being illustrated. The cleats are mounted in such a way that they tend to lift the material with which they are in contact. Also a group is arranged in a circle as indicated in order that material falling from the upper ones will impinge in large part on those directly beneath in order to further reduce the wear on the kiln lining. As indicated in Fig. 2, the relative circumferential position of the cleats, between adjacent groups, is staggered, this arrangement having been found to promote movement of the material through the kiln.

At the entrance end of the kiln the chute 19 is downwardly inclined with respect thereto and is positioned with its discharge portion 65 within a reduced or necked-down end 66 of the kiln. The discharge portion 65 of the chute has its upper surface 67 open in order to permit gaseous products from the kiln which pass into the chute to escape up the stack. Air is drawn up the stack through the space 68 between the kiln and the housing 11 and passes in contact with the chute in order to cool it and prolong its life.

Adjacent to the discharge end of the kiln a ring-gear 70 on the exterior of the kiln drives a chain 71 which drives a raw material feed mechanism 72 through suitable gearing 73. The mechanism 72 includes a conventional conveyor of the bucket type (not shown), which lifts material from the conveyor 18 to the upper end of the chute 19. Auger 74 returns material which falls out of the chute or misses it, to the bucket conveyor. As a result of the raw material feed being driven directly from the kiln, it necessarily follows that the feed is proportioned directly to the speed of rotation of the kiln. The importance of this will appear later.

At the discharge end of the kiln the firing hood 20 is spaced, as indicated in Figs. 2 and 7, from the outer wall of the kiln. Air is drawn in through the space 75 provided and heated for transmission through the pipe 27 to the coal pulverizer. From the coal pulverizer 26, previously described, the coal is drawn through pipe 78 to distribution member 79 from which it is conveyed through pipe 80 through the fan unit 81 to the supply pipe 29 which leads to the nozzles. In the pulverizer the desired level of coal is maintained by suitable control means 82 which are automatically controlled. The air supply to the pulverized fuel is regulated by suitable adjustment of the air intake 83 which is located in the pipe 80.

The fuel supply pipe 29 is connected to a Y-valve 84 which divides the fuel into ducts 85 and 86 connected, respectively, with nozzles 30 and 31. A vane-type regulator 87, which is pivotally mounted at 88, is provided to control the supply of fuel to the nozzles 30 and 31.

With particular reference to Figs. 2 and 3 the nozzles 30 and 31 terminate approximately at the end of the kiln and are positioned slightly above the center thereof and inclined downwardly at an angle to the longitudinal axis of the kiln. Referring to Fig. 3 which is a top view of the nozzles, it will be observed that they are directed to the right side wall of the kiln, viewed from the discharge end.

In the illustration, nozzle 30 provides the main source of heat, the flow to nozzle 31 being restricted so that the velocity of the fuel-air mixture through it is substantially less than that through nozzle 30. Operation of nozzle 31 causes the relatively high velocity fuel discharging from nozzle 30 to ignite nearer to the discharge end of nozzle 30 than it otherwise would, thus reducing the distance from the end of nozzle 30 to the end of the flame therefrom. As a result an intense heat is produced a relatively short distance within the kiln and extends over a limited area.

The firing hood 20 has a front wall 90 which is spaced from the discharge end of the kiln. The discharging materials fall through the space 91 therebetween and onto chute 41. Secondary air simultaneously passes through the space into the kiln. In some installations it is necessary to restrict the intake of secondary air at the discharge end of the kiln. In order to do this, individually mounted slats 92 are swingably attached to the lower surface of the platform 40. The material discharging from the kiln can move the slats sufficiently to pass, and the air intake through the chute is materially reduced.

In the operation of the device the raw material is mined and crushed to the desired size and fed into the kiln through the hoper 19. In passing through the chute 67 it receives some heat from the products of combustion passing up the stack. From the entrance end of the kiln through approximately 25% of its length, the material is advanced through the kiln and its temperature raised to approximately 600°–1200° F. Simultaneously, moisture is removed therefrom. The kiln rotates constantly unless its speed is changed by the operator, at approximately 1½ revolutions per minute and as it does, the material is lifted by the cleats or Z-bars 58 and is therefore constantly tumbled within the kiln in order to have even distribution of heat therethrough.

After passing through the first described zone, the material passes into the second zone, comprising about two-thirds of the kiln's length. In this zone the material is raised to approximately 1700° to 1900° F. As a result of being raised to this temperature, a vitreous surface is produced on the particles due to the fluxing action of certain materials contained therein, primarily the oxides of calcium and magnesium. The vitreous coating may be formed either in the second or the third zone, there being no abrupt transition between the zones.

After passing through zone two, the material is brought into zone three and into proximity to the flames from the nozzles 30, 31, which quickly raises its temperature to approximately 2200° or 2250° F., depending on the material and other factors. This causes gases to be formed within the material which are unable to escape because of the vitreous surface thereon and also because only a small percentage of the air bubbles formed therein are near the exterior of the particles. After expansion occurs the material passes beyond the region in which the heat of the flame is intense and is cooled below the critical temperature by incoming secondary air. The material is then discharged through the space between the kiln and the firing hood onto the chute 41.

The coal from the storage receptacle 23 is finely ground in the pulverizer, mixed with the required amount of air, and blown into the furnace through the nozzles 30, 31. The nozzle 31 is restricted so that it serves to ignite the relatively high velocity stream from the nozzle 30, the result being a relatively short flame of high intensity directed slightly downwardly and at an angle to the ascending side wall of the kiln in such relation to the mass of material that its effectiveness for raising its temperature is at a maximum.

It has been pointed out that it is an important feature of the invention that an intense quantity of heat be directed against the material within a relatively short space and that the flow of gaseous products through the kiln be restricted. The design of the entrance end of the kiln including the substantially necked-down portion 66 and the provision of air intake restricting means 92 at the discharge end are provided to effect this purpose. This slow movement promotes efficient use of the heated combustion gases for raising the temperature of the materials in the kiln and at the same time permits the restriction of the temperature rise of the material to a point well below the critical temperature until the expansion zone is reached.

During operation of the kiln, an operator observes the material through openings 93 in the front wall of the kiln, and also the material discharging down the chute 41. By merely slowing down or increasing the speed of kiln rotation he can increase or decrease, respectively, the maximum temperature reached in the kiln. This provides a simple, yet highly effective system of control. Slowing the rotation decreases the axial velocity of the material, thus subjecting it to the heat for a longer period of time. The feed of the material from the stockpile will also be decreased, thus providing more heat per unit of volume. Increasing the speed has the opposite effect. Fuel feed to the nozzles may also be varied if necessary. It will be understood that due to variations in the raw material and the fuel used, that the critical temperature may vary slightly. Accordingly, constant observation by an operator and regulation of the controls as required, is necessary in order to maintain the optimum operating conditions.

Another factor in the control of the operation is the nature of the fuel that is used. Coal is used whose ash has a low fusing temperature, one that is below the temperature produced in the kiln, and which may be below that of the slate. It is described as a "high volatile coal." In the pulverized form in which it is used, approximately 90% will pass through a 200 mesh screen. The ash from the coal is not distinguishable in the aggregate produced nor is it accounted for in the discharge from the stack. It is believed that it unites with the outer surface of the aggregate material to form a homogeneous outer layer. This outer layer, which is vitrified in passing through zone two, or zone three, assists in the prevention of sticking or agglomeration of the particles in the kiln and also seals the outer surface to permit expansion to the maximum degree desired.

After discharge from the kiln the material may be ground to various degrees of fineness depending upon its ultimate use. In the case of the aggregate which is produced from the non-argillaceous slate the particles, if desired, may be used without being ground and are acceptable as an aggregate in concrete even in sizes up to several inches.

Referring to Fig. 8, a particle of this type is illustrated. The material has a thin outer skin or shell which seals the interior. The interior is permeated with pin-holes and voids, many of which are so fine that they cannot be seen by the naked eye. The product is entirely free from laminations or planes of weakness so that it is substantially equal in strength in all directions. Exteriorly, the skin appears grayish with an occasional splotch of brown, indicating that the atmosphere of the kiln has been reducing. The interior is grayish-green or bluish in appearance and substantially homogeneous. The material is hard and can not be flaked off by hand. The individual particles or lumps have a substantial dimension in all directions and do not have any narrow, weak or sharp extremities, nor any relatively thin sections such as accompany deep depressions or substantial protuberances, and which are relatively easy to fracture. Although the individual particles of aggregate have a substantial dimension in all directions, the particles are generally more nearly cubical or block shaped than they are spherical. It will be understood that particles approaching cubical or block shape are preferable for use in concrete than are spherical shapes, the former providing greater strength of the concrete.

In addition to the desirable particle shape of the aggregate produced from the non-argillaceous slate, the freedom from voids of substantial size and the independence of the voids which are present results in a product of exceptionally low absorptivity, even if crushed. In the uncrushed state, in which it may be used if desired, the absorptivity is low due to the vitreous coating.

Although the invention is not limited to the use of any particular raw material, it is believed that the non-argillaceous slate described has not previously been used in the production of lightweight aggregate. The advantages have previously been pointed out and by using the present invention sufficiently close control of the expending process may be achieved to produce light-weight aggregate from this raw material even though the permissible temperature deviation from the critical, as pointed out, is very small. The non-argillaceous slate has approximately the following composition:

| | Percent |
|---|---|
| Silica ($SiO_2$) | 55–67 |
| Alumina ($Al_2O_3$) | 15–25 |
| Iron ($Fe_2O_3$) | 5–9 |
| Calcium (CaO) | .02–2.5 |
| Magnesium oxide (MgO) | .5–3.5 |
| Sulfur ($SO_3$) | Tr. to 0.90 |
| Potassium and sodium oxides ($K_2O$, $Na_2O$) | 0.10–3.8 |
| Loss on ignition (approx.) | 5 |

Accordingly, the invention includes novel kiln apparatus for gradually heating selected raw material particles to a temperature substantially below a critical temperature, and suddenly heating it intensely to quickly raise it to the critical temperature necessary for expansion, and cooling it immediately to prevent agglomeration. As a result accurate control of the temperature reached, including by means of limiting the intake of secondary air, weathered argillaceous slate, and unweathered nonargillaceous slate may be expanded to produce a superior and novel lightweight aggregate.

Although a particular embodiment of the invention has been described, it will be understood by those skilled in the art that various modifications are within the scope thereof and therefore that the invention is not limited to the illustrated embodiment but only as defined in the following claims.

What is claimed is:

1. A lightweight aggregate formed from particles of non-argillaceous slate formed of fine-grained, water-lain volcanic ash having approximately the following composition:

| | Percent |
|---|---|
| Silica ($SiO_2$) | 55–67 |
| Alumina ($Al_2O_3$) | 15–25 |
| Iron ($Fe_2O_3$) | 5–9 |
| Calcium (CaO) | .02–2.5 |
| Magnesium oxide (MgO) | .5–3.5 |
| Sulfur ($SO_3$) | Tr. to 0.90 |
| Potassium and sodium oxides ($K_2O$, $Na_2O$) | 0.10–3.8 |
| Loss on ignition (approx.) | 5 | consisting essentially of a mass of particles, each of which has been expanded in substantially all directions from its natural state, the surface being substantially free from protuberances or declivities of substantial size, and having a layer of relatively dense vitrified material on its exterior, the interior comprising a substantially homogeneous mass unbroken by cleavage planes and permeated by voids ranging from approximately 1/16" in diameter downwardly to a size imperceptible to the unaided eye, the majority of such voids being of a size below 1/64" in diameter, the material when crushed not producing material in sliver form, having substantially uniform resistance to crushing in all directions, and low absorptivity.

2. An aggregate according to claim 1, the layer of dense vitrified material including in homogeneous combination the ash from a high volatile coal having a fusing temperature below that of the heat producing the expansion.

3. A kiln comprising an elongated cylindrical housing forming a chamber, said housing having one end at a higher elevation than the other, the end at the higher elevation providing an inlet and the end at the lower elevation providing an outlet for material treated therein, means for rotating the kiln to cause material introduced to travel from the inlet longitudinally of the chamber to the outlet, heating means adjacent to the outlet for directing a high concentration of heat onto material treated over a limited area, said heating means including a pair of nozzles having their discharge ends substantially parallel and in side-by-side proximity to each other, a source of fuel supply, means connecting said source of fuel supply to said nozzles, and proportioning regulator means operably associated with said nozzles for restricting flow through one of the nozzles so that the ignited fuel discharging from the nozzle having its flow restricted will assist in igniting fuel discharging from the other nozzle in proximity to the discharge end thereof.

4. In a cylindrical rotatably mounted kiln having a raised end for receiving material and a lower discharge end, means for rotating the kiln whereby material introduced through the raised end will travel longitudinally of the kiln to the discharge end, heating means extending into said discharge end, a hood housing said discharge end, said hood being spaced from the lower portion of the discharge end to provide a discharge opening for the material, damper means across said discharge opening permitting only a limited flow of air into the kiln past the damper means, said damper means comprising a plurality of spaced substantially vertically disposed pivotally mounted elongated members extending across the discharge opening and movable to permit the discharge of material upon engagement of such material with said pivotally mounted elongated members.

5. In a cylindrical rotatably mounted kiln having a raised inlet end for receiving material and a lower outlet end for discharging material, the inlet end having an annular restricting collar extending radially inward a substantial distance and providing a central opening of reduced size through which products of combustion may be discharged in counterflow relation to the material being received, burner means extending into said outlet end for directing concentrated heat against material within a limited area adjacent the outlet end of the kiln, hood means over said outlet end, said hood means being spaced from the lower portion of the outlet end of the kiln in order to provide a discharge opening for the material, and damper means across and restricting said discharge opening and providing a predetermined passage for air so that the flow of secondary cooling air into the kiln will be limited at all times, said damper means comprising flexible wall means extending across said opening and movable upon engagement of the material with said flexible wall means to allow the discharge of said material.

6. In a cylindrical rotatably mounted kiln having a raised end for receiving material and a lower discharge end, heating means at said discharge end, said heating means comprising a pair of nozzles having their discharge ends substantially parallel and in side-by-side proximity to each other, a source of fuel supply, means connecting said source of fuel supply to said nozzles, proportioning regulator means operably associated with said nozzles for restricting flow through one of the nozzles, hood means over said discharge end and spaced from the lower portion thereof to provide a discharge opening for the material between said hood means and said discharge end, damper means across said discharge opening and permitting only a limited flow of air into the kiln past said damper means, said damper means comprising flexible wall means extending across said discharge opening and movable upon engagement of such material with said flexible wall means to allow discharge of said material.

7. The method of heat treating raw material to produce a lightweight aggregate, comprising introducing the raw material into the upper end of a rotatably mounted elongated inclined kiln, rotating the kiln to cause the material to progress downwardly therethrough, subjecting it to a slow moving substantially restricted flow of heated products of combustion in order to gradually raise its temperature and avoid thermal shock until just prior to its reaching the lower end of the kiln, exposing said material by limited areas thereof just prior to its reaching the lower end of the kiln to a short concentrated flame from burner means adjacent to the discharge end of the kiln, rapidly heating said limited area of material by said burner means to cause it to expand and become viscous and to impede its progress through the kiln whereby the material is within said limited area for a substantially longer time than if it were free-flowing, passing secondary air over the material as it discharges from the kiln in order to cool the material and heat the air as it flows into the kiln, the effect of such cooling causing the material to flow more rapidly, and substantially restricting the flow of said secondary air over the material with the result that a reducing atmosphere is obtained, such restricting and the heat from the flame resulting in maintaining the pressure in the kiln in the immediate area of concentrated heat above that external to the kiln.

8. The method of claim 7, and employing pulverized coal in the burner means, such coal having an ash whose fusing temperature is below the highest temperature produced by the burner means, the ash uniting with the outer surface of the raw material to form a vitrified layer during the heating process.

References Cited in the file of this patent

UNITED STATES PATENTS

| | | |
|---|---|---|
| 1,707,395 | Hayde | Apr. 2, 1929 |
| 1,927,102 | Sucetti | Sept. 19, 1933 |
| 2,137,185 | Seil | Nov. 15, 1938 |
| 2,209,163 | Kaloustian | July 23, 1940 |
| 2,209,170 | Nevin et al. | July 23, 1940 |
| 2,269,700 | Treshow | Jan. 13, 1942 |
| 2,293,992 | Lindhard | Aug. 25, 1942 |
| 2,388,060 | Hicks | Oct. 30, 1945 |
| 2,430,601 | Cleary | Nov. 11, 1947 |
| 2,487,369 | Plotner | Nov. 8, 1949 |
| 2,498,355 | Bomgren | Feb. 21, 1950 |
| 2,501,962 | Pierce | Mar. 28, 1950 |
| 2,526,073 | Gardner | Oct. 17, 1950 |
| 2,621,160 | Johnson et al. | Dec. 9, 1952 |
| 2,627,642 | Osborne | Feb. 10, 1953 |
| 2,642,273 | Dube | June 16, 1953 |